(12) United States Patent
Satzler

(10) Patent No.: US 6,213,870 B1
(45) Date of Patent: Apr. 10, 2001

(54) STALL PREVENTION SYSTEM

(75) Inventor: Ronald L. Satzler, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/275,152

(22) Filed: Mar. 24, 1999

(51) Int. Cl.⁷ .............................. A01F 12/28; A01F 12/56
(52) U.S. Cl. ................................... 460/6; 460/7; 460/116
(58) Field of Search .......................... 56/10.2 B, 10.2 C, 56/10.2 G, DIG. 15; 460/3, 6, 7, 116, 119

(56) References Cited

U.S. PATENT DOCUMENTS

| | | | |
|---|---|---|---|
| 3,608,557 | 9/1971 | Evans | 130/27 |
| 4,130,980 | * 12/1978 | Fardal et al. | 56/10.2 |
| 4,248,249 | 2/1981 | Dunn et al. | 130/27 T |
| 4,337,611 | * 7/1982 | Mailander et al. | 56/10.2 G |
| 4,348,855 | * 9/1982 | DePauw et al. | 56/10.2 G |
| 4,396,087 | 8/1983 | Rock et al. | 180/243 |
| 4,400,930 | 8/1983 | Huhman et al. | 56/11.6 |
| 4,458,471 | 7/1984 | Herwig | 56/10.2 |
| 4,513,562 | 4/1985 | Strubbe | 56/10.2 |
| 4,893,241 | * 1/1990 | Girodat et al. | 56/10.2 G |
| 4,934,985 | 6/1990 | Strubbe | 460/4 |
| 5,586,033 | 12/1996 | Hall | 364/424.07 |
| 5,873,227 | * 2/1999 | Arner | 46/14.6 |
| 5,957,773 | * 9/1999 | Olmstead et al. | 460/7 |
| 5,995,895 | * 11/1999 | Watt et al. | 701/50 |
| 6,036,597 | * 3/2000 | Arner | 460/6 |
| 6,059,656 | * 5/2000 | Satzler | 460/116 |

* cited by examiner

Primary Examiner—Thomas B. Will
Assistant Examiner—Meredith C. Petravick
(74) Attorney, Agent, or Firm—Jeff A. Greene

(57) ABSTRACT

A rotating concave grain threshing system has a rotor positioned within a concave. The rotor and concave are each rotatable in different preselected speeds and directions through respective transmissions connected to a power source. Measurements are taken corresponding to a physical property of the crop being harvested and the torque induced on the concave. A signal is generated and is responsive to changes in the measurements and delivered to a controller. The controller will then create a controlling signal corresponding to a difference between the desired physical property and the measured physical property and/or the desired torque and the measured torque being greater than a preselected amount. An actuator receives the controlling signal and changes the speed of the concave in response to the magnitude of the received controlling signal.

15 Claims, 5 Drawing Sheets

Fig_4_
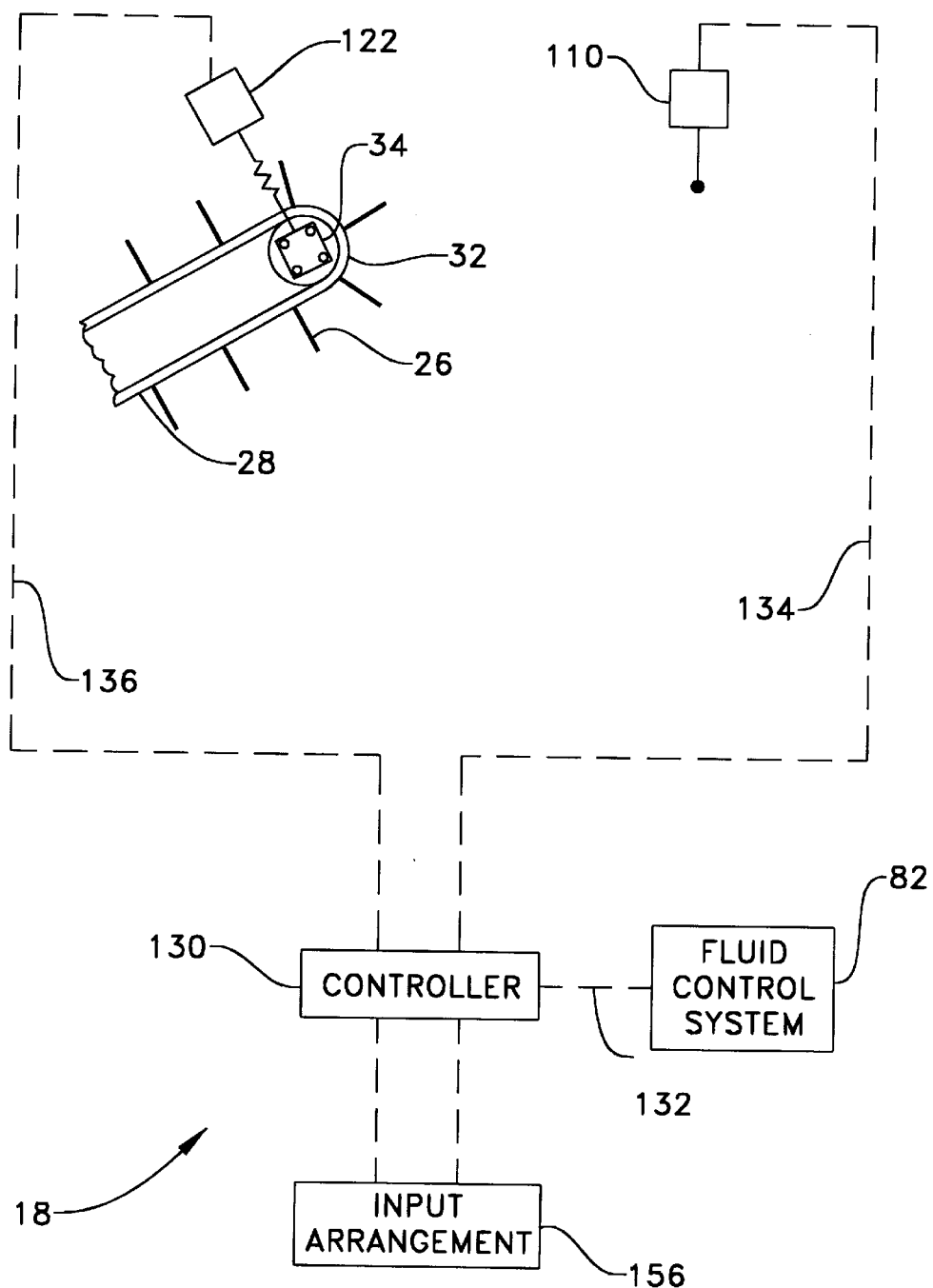

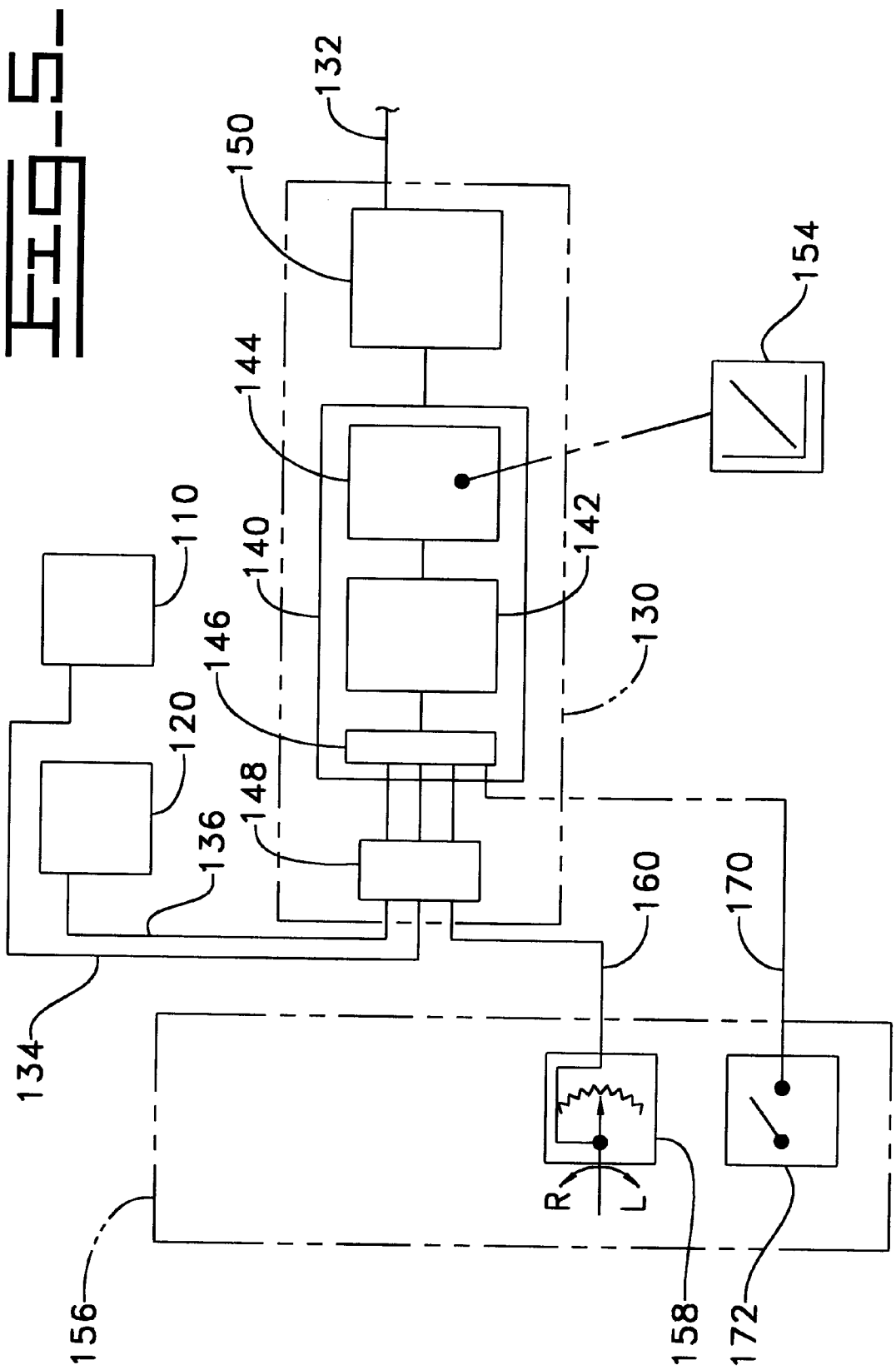

STALL PREVENTION SYSTEM

TECHNICAL FIELD

The present invention relates to grain threshing systems and more particularly to a control system for preventing stalling of the grain threshing system.

BACKGROUND ART

The modern grain threshing system of combines represents one of the most operationally complex and costly pieces of agricultural equipment. Its level of performance in accomplishing its functions can be profoundly influenced by a multitude of operator adjustments, many of which can be made during actual operation. The combine also encounters a wide range of harvesting situations and crop conditions. Because of these variables the potential for stalling the grain threshing system of the combine exists.

Stalling can occur when the combine encounters variables such as, intermittent high density of the crop, patches of weeds having exceedingly high moisture content, and ingestion of foreign obstacles such as rocks and pieces of wood. Rocks, wood, and other foreign obstacles are typically encountered when attempting to harvest crops which have been broken down by high winds, hail, and rain.

Previously used methods of preventing stalling in conventional threshing systems of combines includes slowing down the feed rate of material delivered to the threshing system by slowing down the feeder chain, reducing the forward speed of the combine, and reversing rotational direction of the threshing mechanism. These methods are relatively ineffective in maintaining productivity and efficiency. Therefore development of a more effective control system for the combine threshing system is desired.

One of the more recent developments in threshing systems is the rotating concave threshing system known in the art as a Bi-Rotor™ threshing system which utilizes a rotor positioned within a rotating concave. The construction of the rotating concave threshing system offers unique opportunities for preventing stalling, by providing a control system for monitoring the above listed factors to prevent stalling.

Although similar control systems have been designed for conventional grain threshing systems to improve performance, they have been relatively unsuccessful owing to the slow responsiveness of the system. This is caused by the large amount of kinetic energy generated by the conventional grain threshing systems in which the rotor turns and not the concave. However, the grain threshing system of this invention generates very low energy in the rotating concave and for the first time makes possible stall prevention control of high effectiveness. The present invention is directed to overcome one or more of the problems as set forth above.

DISCLOSURE OF THE INVENTION

In one aspect of the present invention a stall prevention system is provided for a combine harvester. The current harvester has a rotor positioned within a concave and both are independently connected to a power source. The rotor and the concave are each rotatable in preselected speeds and directions independent of the other. The concave is connected to the power source via a transmission and a fluid control system adapted to controllably, selectively rotate it at different variable rotational speeds. A torque-measuring device for measuring the torque induced on the concave and delivering to the stall prevention system a signal responsive to the measurement. A controller connected to the torque measuring device and adapted to receive the signal and deliver a controlling signal. An actuator is connected to the concave transmission and adapted to receive the controlling signal and change the speed of the concave in response to the magnitude of the received controlling signal.

In yet another aspect of the current invention a stall prevention system is provided for a combine harvester having a rotor positioned within a concave, and both are independently connected to a power source. The rotor and the concave are rotatable in preselected speeds and directions one independent of the other. The concave is connected to the power source via a transmission and to a fluid control system adapted to controllably, selectively rotate the concave at different variable rotational speeds. The stall prevention system includes a physical property-measuring device for measuring a physical property responsive to a change in material entering the rotor and concave. The physical property-measuring device delivers to the concave speed control system a signal responsive to the measurement. A controller is connected to the physical property-measuring device and adapted to receive the signal and deliver a controlling signal. An actuator is connected to the concave transmission and adapted to receive the controlling signal and change the speed of the concave in response to the magnitude of the received signal.

BRIEF DESCRIPTION OF THE DRAWINGS

FIG. 4 is a diagrammatic schematic drawing of the stall prevention control system on the rotating concave threshing system; and FIG. 5 is a diagrammatic schematic drawing of the stall prevention system of FIG. 4 showing additional details.

BEST MODE FOR CARRYING OUT THE INVENTION

Figure 1:
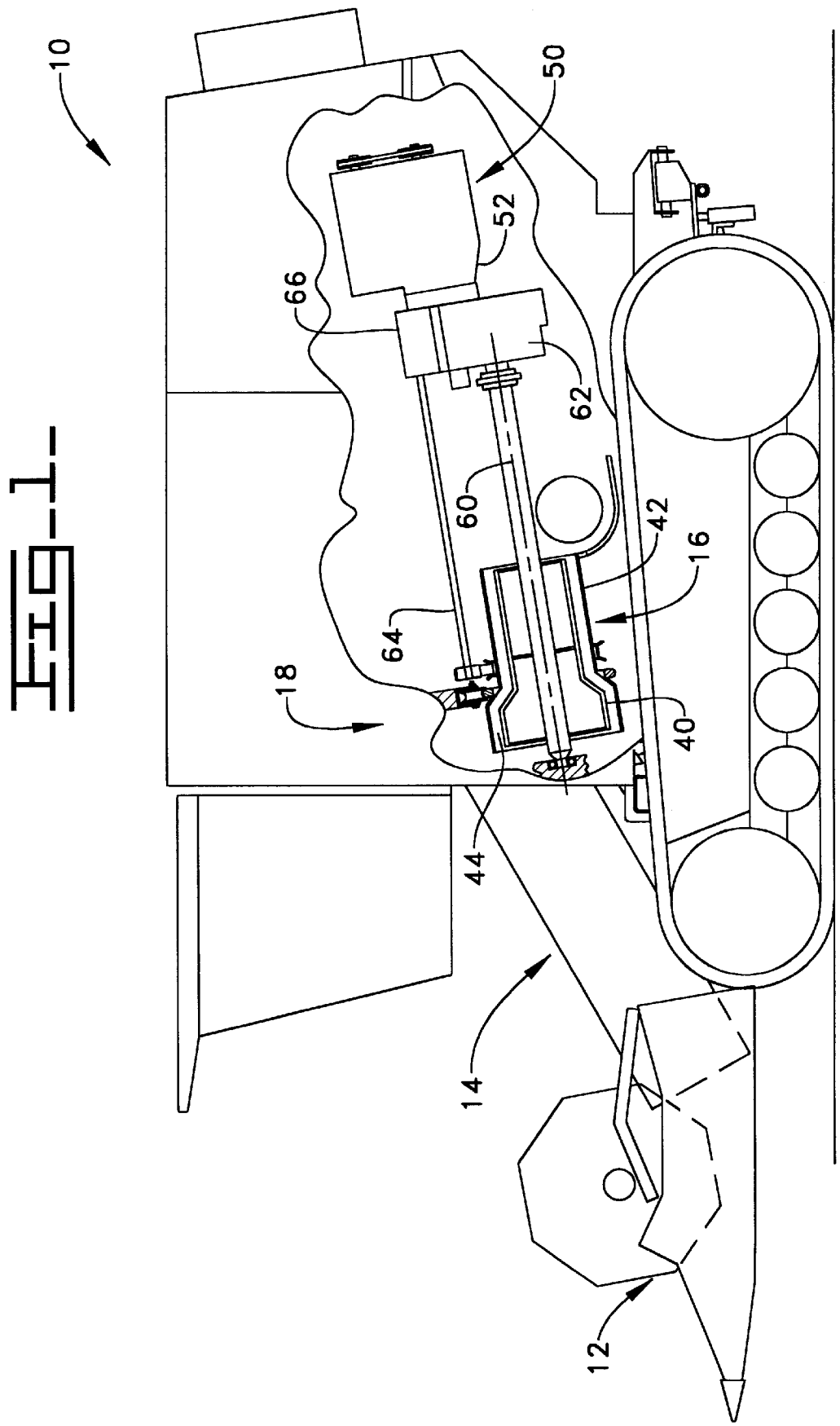
FIG. 1 is a diagrammatic view of a combine having a rotating concave threshing system.
Figure 2:
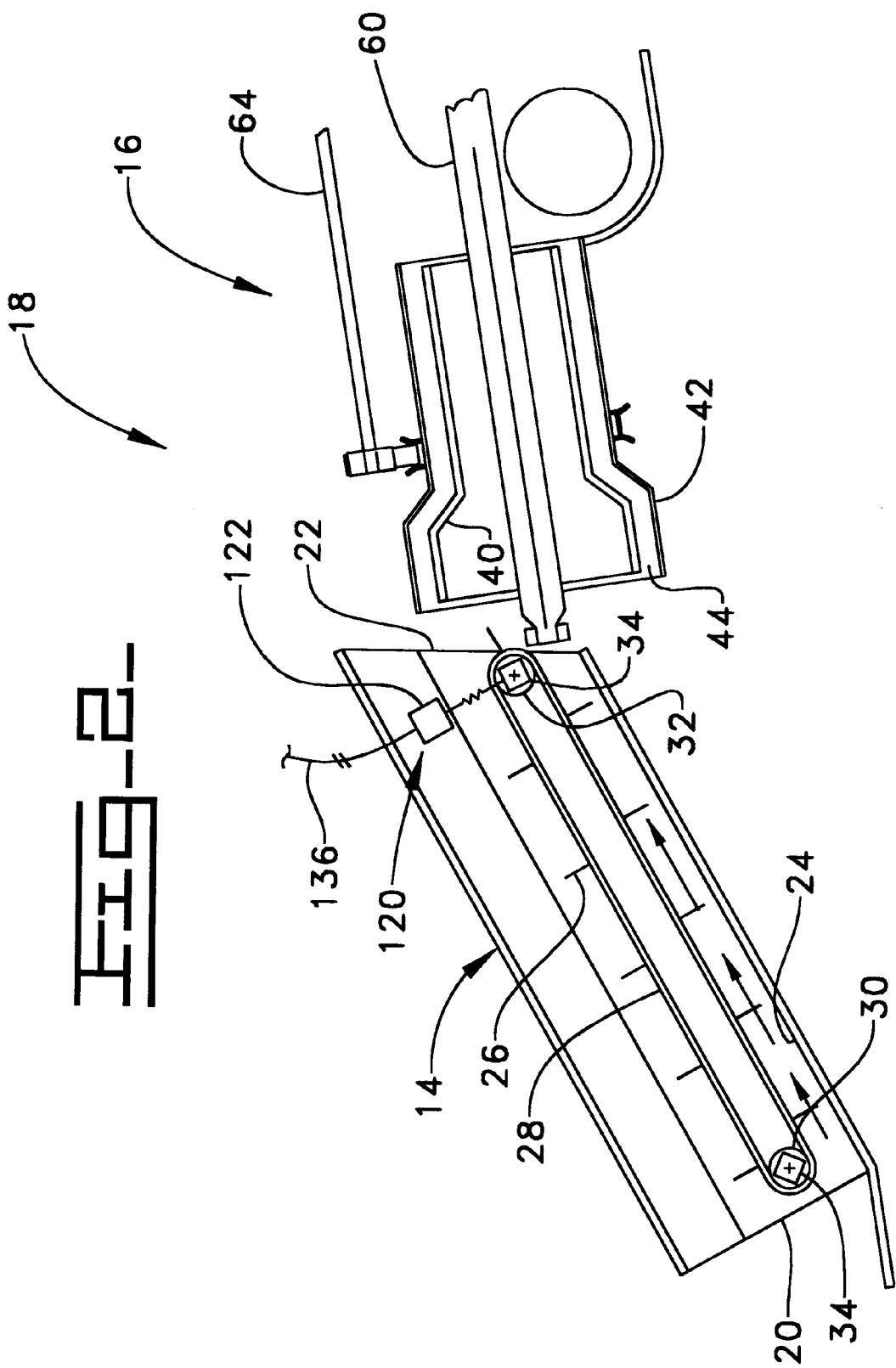
FIG. 2 is an enlarged view of the feederhouse and the grain threshing system.

Referring to FIGS. 1 and 2, a combine 10 is shown having a harvesting head 12, a feederhouse 14, and a grain threshing system 16. The harvesting head 12 is configured to receive, cut, and then transfer crop to the feederhouse 14 in a known manner. A stall prevention system 18 includes the feeder house 14, the grain threshing system 16, and components as described below.

As best seen in FIG. 2 the feederhouse 14 has an inlet end 20 and an outlet end 22 and a conveyor 24. Crop is transported up the feederhouse 14 by the conveyor 24. The conveyor 24 for example, includes a plurality of paddles 26, mounted to an endless belt 28 that is entrained around a first roller 30 and a second roller 32. The ends of the first roller 30 and the second roller 32 are rotatably mounted to supports 34. The supports 34 are slidably mounted to the inside walls of the feederhouse 14. The supports 34 allow for upward deflection of the first and second rollers 30, 32 when variations in the clump size of crop being harvested are encountered.

The grain threshing system 16 has a rotor 40 positioned within a concave 42. The crop passes from the feederhouse 14 into an annulus 44 defined between the rotor 40 and the concave 42. The rotor 40 and concave 42 are independently connected to a power unit 50. The power unit 50 consists of an internal combustion engine 52 and a hydraulic pump 54. The rotor 40 is driven by a shaft 60 that is connected to the power unit 50 via a rotor transmission 62. A shaft 64 connects the concave 42 to the power unit 50 via a concave transmission 66. The rotor 40 and the concave 42 are each rotatable in preselected speeds and directions independent of the other.

The rotor transmission 62 is preferably a multi-ratio gear type transmission of know construction, having a number of preselected gear ratios. In this application for example rotor transmission 62 has three distinct gear ratios necessary for rotating the rotor 40 when harvesting small, medium and large grain. As is well known, a slower rotational speed of the rotor 40 is desirable for large grain, such as corn and soybeans. When harvesting grains, such as wheat, flax, milo and oats, it is desirable to increase the rotational speed of the rotor 40. Additionally, when harvesting even smaller grain such as rape, grass and clover, it is desirable to further increase the rotational speed of the rotor 40. It is recognized that for some specific threshing operations additional preselected gear ratios may be desirable.

Figure 3:
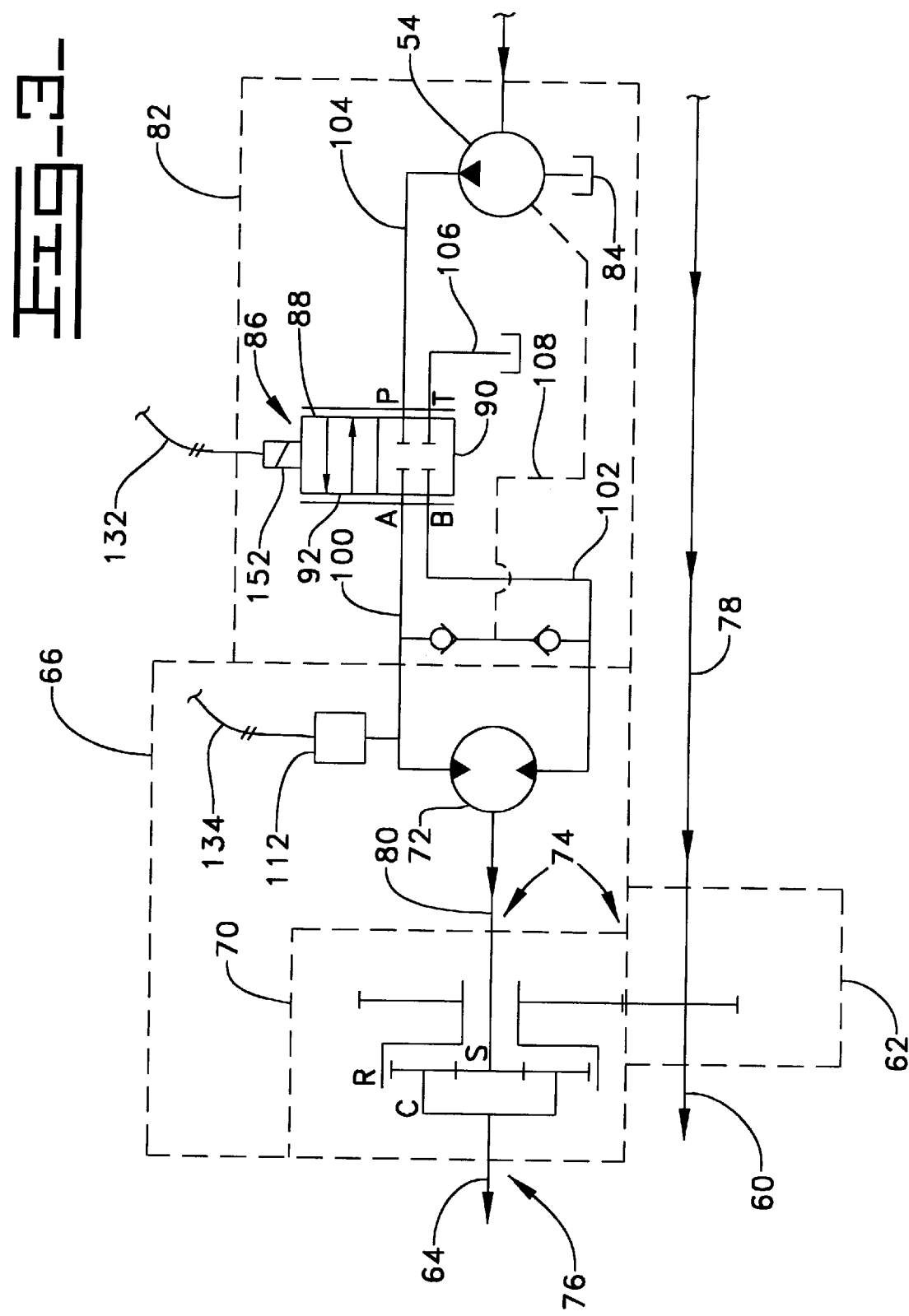
FIG. 3 is a diagrammatic view of a transmission arrangement embodying the present invention.

The concave transmission 66, seen in FIG. 3, is shown as being a hydro-mechanical arrangement. It should be recognized however that the concave transmission 66 could be other such arrangements without departing from the spirit of the invention. The concave transmission 66 comprises a planetary gear arrangement 70, of a given construction, and a hydraulic motor 72. The planetary gear arrangement 70 has a first or input end 74 and a second or output end 76. Power is transmitted to the input end 74 of the planetary gear arrangement 70 from the power unit 50 by an input shaft 78. Power is transmitted from the output end 76 of the planetary gear arrangement 70 to the concave 42 via shaft 64. The hydraulic motor 72 has an output shaft 80 that is used to transmit power to the input end 74 of the planetary gear arrangement 70.

Still referring to FIG. 3, a fluid control system 82 is connected to the hydraulic motor 72 and actuatable to direct pressurized fluid flow to the hydraulic motor 72. The fluid control system 82 includes the pump 54, a reservoir 84 and an actuator 86. Actuator 86 is an electrically operated control valve 88 and is preferably infinitely variable and movable from a fluid blocking position 90 to a fluid directing position 92. However, it should be recognized that the actuator 86 could be a variable displacement pump without departing from the spirit of the present invention. The actuator 86 is connected to communicate fluid flow between the pump 54, the hydraulic motor 72, and the reservoir 84.

The hydraulic motor 72 is connected to pressure or "a" side of the actuator 86 by conduit 100 and to the return or "b" side of the actuator 86 by conduit 102. The actuator 86 is connected to the pressure or "p" side of the pump 54 by conduit 104. Fluid is returned from the return side or "t" port of the actuator to the reservoir 84 by conduit 106. A low-pressure conduit 108 supplies fluid, in a common manner, from the pump 54 to conduits 100, 102 to compensate for leakage therein.

The concave transmission 66 is arranged, for example, so that during normal threshing conditions the hydraulic motor 72 speed is zero and the rotational speed of the concave 42 is 50 rpm. Movement of the actuator 86 a preselected amount from the fluid blocking position 90 towards the fluid directing position 92 supplies a predetermined flow of pressurized fluid to the hydraulic motor 72. This flow of pressurized fluid rotates the hydraulic motor 72 to a prese-lected speed, causing the rotational speed of the concave 42 to slow and eventually become zero. Further movement of the actuator 86 from the fluid blocking position 90 to the full fluid directing position 92 delivers the maximum amount of pressurized fluid to the hydraulic motor 72. The maximum flow of pressurized fluid further accelerates the hydraulic motor 72 beyond the preselected speed causing the rotational direction of the concave 42 to reverse. As the concave 42 speed slows and then reverses, the relative speed between the rotor 40 and concave 42 increases.

As best seen in FIG. 3 a torque-sensing device 110 is shown for example as being connected to conduit 100 between the actuator 86 and the hydraulic motor 72. In this application the torque-sensing device 110 is a pressure sensor 112 that is used to sense the pressure induced on the hydraulic motor 54. However, the torque-sensing device 110 could be a torque meter, or any other known device that would communicate directly with the concave 16 for sensing and measuring torque. The torque-sensing device 110 continuously monitors the torque induced on the hydraulic motor 72 during operation creating a feedback signal responsive to the magnitude of the torque.

As shown in FIG. 2 a physical property sensing device 120 is associated with the grain threshing system 16 for sensing a physical property of the material entering the annulus 44 between the rotor 40 and concave 42. The physical property-sensing device 120 is shown as being a load cell 122 connected to one of the pair of supports 34 near the outlet end 22 of the feederhouse 14. The load cell 122 is used for sensing a physical property, and is for example the size of the mat or clump of harvested crop. The size of the mat is measured by sensing the amount of deflection of the second roller 32 as crop is advanced up the feederhouse 14 and under the conveyor 24. It should be recognized however, that the physical property sensing device 120 could be a moisture sensor, an optical sensor, or any other known device used to sense a physical property of a crop without departing from the spirit of the present invention. The physical property sensing device 120 continuously monitors the harvested crop being transported through the feederhouse 14 and entering the grain threshing system 16 creating a feedback signal responsive to the magnitude of the physical property being harvested.

As best seen in FIG. 4 a controller 130 is associated with the stall prevention system 18. The controller 130 is connected to the fluid control system 82, the torque sensing device 110, and the physical property sensing device 120 by electrical conductors 132,134,136. The controller 130 determines the desired rotational speed of the concave 42 based on the specific setup of the combine 10 (i.e. type of crop being harvested, engine rpm, ground speed, etc.). A concave rotational speed correcting signal is delivered by the controller 130 in response to changes between the desired rotational speed and measurements from the torque sensing device 100 and the physical property sensing device 110.

The fluid control system 82 is connected to the controller 130 and is responsive to the delivery of the correcting concave rotational speed signal to direct pressurized fluid to the control valve 88. The position to which the control valve 88 is shifted from the fluid blocking position 90 to the directing position 92 is a function (+ or −) of the control signal being delivered.

Referring to FIG. 5, the controller 130 includes a computer 140 having a processor 142, a memory 144, and an I/O port 146. The controller 130 may also include an analog to digital (A/D) converter 148 in applications where analog signaling devices are used and where analog signals are provided to the controller 130. The controller 130 also includes a driver circuit 150, which is connected to the computer 140 and to a solenoid 152 of the actuator 86 by conductor 132. The driver circuit 150 is of a conventional design and responds to signals delivered from the computer 140 to actuate the actuator 86. It should be recognized that the computer 140 herein described includes equivalent discrete electronic components of any suitable arrangement capable of performing the desired logic functions in either an open or closed loop.

The processor 142 receives feedback signals, and based on the specific setup of the combine 10, determines the desired speed of the concave 42. This determination is made in accordance with preprogrammed information 154 stored in memory 144. Information 154 includes data, maps, look-up tables and the like. The processor 142 compares the desired physical property of the crop and the physical property measured by the physical property-measuring device 120. The processor 142 also compares the desired torque induced on the concave 42 and the torque measured by the torque-measuring device 110. The processor 142 delivers a controlling signal in response to a difference between the desired physical property and the measured physical property and/or the desired torque and the measured torque being greater than a preselected amount. The preselected amount is an accepted error and tolerance determined either mathematically or empirically and considers factors such as ground speed, type of crop being harvested and other operation parameters.

The controlling signal is delivered to the driver 150. This causes actuation of the solenoid 152 based on the controlling signal. Solenoid 152 responds to electrical energy delivered by the driver circuit 150 and shifts the actuator 86 to an appropriate one of the neutral and fluid directing positions 90,92.

Referring now to FIG. 5, the stall prevention system 18 includes an operator input arrangement 156 by which the vehicle operator selects various harvesting options and makes various selections. The operator input arrangement 156 includes a crop selector device 158 connected the controller 130 by electrical conductor 160. The crop selector device 158 is movable to select between different crops to be harvested. In particular, the crop selector device 158 is connected by an electrical conductor 160 to the controller 130 and delivers a concave rotational speed signal to the controller 130 in response to input selections thereof. The controller 130, based on the harvesting options delivered, responds and causes the driver circuit 86 to deliver concave rotational speed control signal to the concave transmission 66. The concave rotational speed control signal shifts the actuator 86 to an appropriate position from one of the fluid blocking and fluid directing positions 90, 92.

An electrical conductor 170 connects an automatic-manual mode switch 172 to the controller 130. The automatic-manual mode switch 172 is movable between an automatic mode position at which the concave rotational speed control signal is free to pass from the controller 130 and a manual mode position at which the concave rotational speed control signal is blocked from passing from the controller 130. The automatic-manual mode switch 172 delivers either an enabling or disabling signal to the controller 130 depending on the position selected. When the automatic-manual mode switch 172 is at the automatic mode position, actuation of the solenoid 152 by the crop selector device 158 is prevented at the controller 130.

INDUSTRIAL APPLICABILITY

With reference to the drawings and in operation, the combine 10 is setup for the desired grain to be harvested and begins harvesting the crop. The harvested crop is cut by the harvesting head and transported up the feederhouse 14. The stall prevention system 18 is associated with the grain threshing system 16 and takes measurements, which are responsive to changes in the size or physical property of material entering the rotor 40 and concave 42. Measurements are also taken at the concave 42 and measure the amount of torque induced thereon. These signals are continuously processed together with input data correlating to the desired rotational speed of the concave 42.

As crop and/or foreign material of the type and consistency which overload and cause stalling of the grain threshing system 16 are encountered, the representative changes in conditions are instantly signaled to a controller 130. The controller 130 will then create a controlling signal corresponding to a difference between the desired physical property and the measured physical property and/or the desired torque and the measured torque being greater than a preselected amount. The controlling signal is delivered to the actuator 86 to change the rotational speed of the hydraulic motor 72 which in turn changes the rotational speed of the concave 42. Owing to the low kinetic energy generated by the rotating concave 42, the speed change can be readily accomplished. By changing the rotational speed of the rotating concave 42 the relative speed between the rotor 40 and the concave 42 is easily changed. Thus, allowing an increased volume to pass through the annulus 44 between the rotor 40 and the concave 42, preventing stalling of the grain threshing system 16.

Other aspects, objects and advantages of this invention can be obtained from a study of the drawings, the disclosure and the appended claims.

What is claimed is:

1. A stall prevention system for a combine harvester having a concave, said concave being connected to a power source and being rotatable in preselected speeds and directions the stall prevention system comprising:

a transmission being connected between the power source and the concave, said transmission adapted to controllably, selectively rotate said concave at variable rotational speeds;

a torque-measuring device for measuring the torque induced on the concave and delivering to the stall prevention system a signal responsive to said measurement;

a controller connected to the torque measuring device and adapted to receive said measurement signal and deliver a controlling signal; and an actuator connected to said transmission and adapted to receive said controlling signal and change the speed of the concave in response to the magnitude of the received controlling signal.

2. A stall prevention system for a combine harvester, as set forth in claim 1, wherein the transmission is hydro-mechanical.

3. A stall prevention system for a combine harvester, as set forth in claim 1, wherein the torque measuring device is a pressure sensor.

4. A stall prevention system for a combine harvester, as set forth in claim 1, wherein the actuator is an electrically operated control valve.

5. A stall prevention system for a combine harvester, as set forth in claim 4, wherein the electrically operated control valve is infinitely variable.

6. A grain threshing system, as set forth in claim 1, wherein the actuator is a variable displacement pump.

7. A stall prevention system for a combine harvester, as set forth in claim 1, further including a physical property measuring device for measuring a physical property and delivering to the stall prevention system a signal responsive to said measurement.

8. A stall prevention system for a combine harvester having a rotor positioned within a concave, said rotor and concave each being independently connected to a power source and each being rotatable in preselected speeds and directions independent of the other, the stall prevention system comprising:

- a transmission being connected between the power source and the concave, said transmission adapted to controllably, selectively rotate said concave at variable rotational speeds;
- a physical property measuring device for measuring a physical property of material entering the rotor and concave and delivering a signal responsive to said measurement;
- a controller connected to the physical property measuring device and adapted to receive said measurement signal and deliver a controlling signal; and
- an actuator connected to said transmission and adapted to receive the controlling signal and change the speed of the concave in response to the magnitude of the received signal.

9. A stall prevention system for a combine harvester, as set forth in claim 8, wherein the physical property measuring device is a load cell.

10. A stall prevention system for a combine harvester, as set forth in claim 8, wherein the physical property measuring device is an optical sensor.

11. A stall prevention system for a combine harvester, as set forth in claim 8, wherein the transmission is hydromechanical.

12. A stall prevention system for a combine harvester, as set forth in claim 8, wherein the actuator is a proportional valve.

13. A stall prevention system for a combine harvester, as set forth in claim 8, wherein the actuator is a variable displacement pump.

14. A stall prevention system for a combine harvester, as set forth in claim 8, wherein the magnitude of the measurement signal is a function of the physical property of the material entering the rotor and concave and is a measurement of the hydraulic pressure in the hydraulic motor.

15. A method for preventing stalling of a combine harvester having a rotor positioned within a concave, said rotor and concave each being independently connected to a power source and each being rotatable in preselected speeds and directions independent of the other, said concave being connected to the power source via a transmission, comprising the steps of:

- measuring one of a physical property of material entering the rotor and concave, and a torque induced on the concave;
- delivering a signal, responsive to the measurement, to the stall prevention system;
- generating a controlling signal in response to the magnitude of the received measurement signal; and
- controlling the transmission to change the speed of the concave in response to the magnitude of the received controlling signal.

* * * * *